United States Patent [19]

Tsuno et al.

[11] Patent Number: 4,605,202
[45] Date of Patent: Aug. 12, 1986

[54] BALL VALVE

[75] Inventors: Kazuhiko Tsuno; Nitiro Sano, both of Nobeoka, Japan

[73] Assignee: Asahi Yukizai Kogyo Co., Ltd., Miyazaki, Japan

[21] Appl. No.: 656,882

[22] Filed: Oct. 2, 1984

[30] Foreign Application Priority Data

Oct. 28, 1983 [JP] Japan ............................. 58-166050[U]
Dec. 8, 1983 [JP] Japan ............................. 58-188583[U]
Jul. 23, 1984 [JP] Japan ............................. 59-110209[U]

[51] Int. Cl.$^4$ .............................................. F16K 5/06
[52] U.S. Cl. .................................. 251/315; 277/167.5; 277/207 A; 277/211
[58] Field of Search .......................... 251/315, 316; 277/167.5, 207 R, 207 A, 211

[56] References Cited

U.S. PATENT DOCUMENTS

| 3,007,669 | 11/1961 | Fredd | 251/315 |
| 3,095,177 | 6/1963 | Muller | 277/207 R |
| 3,099,110 | 7/1963 | Spaight | 277/207 A |
| 3,334,650 | 8/1967 | Lowrey et al. | 251/315 |
| 3,428,292 | 2/1969 | Scaramucci | 251/315 |
| 3,717,323 | 2/1973 | Geipel | 251/315 |
| 4,418,918 | 12/1983 | Nicoll | 277/167.5 |
| 4,449,694 | 5/1984 | Hobart et al. | 251/315 |
| 4,477,092 | 10/1984 | Bush | 277/167.5 |
| 4,523,608 | 6/1985 | Miller | 251/315 |

Primary Examiner—Martin P. Schwadron
Assistant Examiner—Sheri M. Novack
Attorney, Agent, or Firm—Burns, Doane, Swecker & Mathis

[57] ABSTRACT

A ball valve for controlling liquid flow that comprises a tubular valve body, a ball rotatably built-in inside of the valve body, a pair of unions screwed into opposite ends of the valve body so as to be in slidable contact with the ball, and a pair of body caps connected to outer ends of each union through a packing ring for providing a water-tight seal therebetween. This valve have no cavities therein which cavities tend to entrap the liquid during the passage thereof. According to this construction the valve is kept always clean and free from any contamination caused by the putrescence of the entrapped liquid, even when used in the food industry.

6 Claims, 10 Drawing Figures

BALL VALVE

BACKGROUND OF THE INVENTION

1. Field of the Invention

The present invention relates to a ball valve, in particular, it relates to a ball valve made of plastic and suitable for utilization in the food industry for transporting perishable liquids or purified water.

2. Description of the Prior Art

The conventional ball valve, for example, as disclosed in Japanese Unexamined Utility Model Publication (Kokai) No. 58-89656, comprises, as illustrated in FIG. 1, a valve body 1 of a cylindrical shape, a ball 2 accommodated in the valve body 1 and having a through-channel in the central portion, a pair of unions 3, each attached to opposite ends of the valve body 1 so as to be in slidable contact with the ball through a seat 9, and a pair of body caps 4 each connected to the outer end of the unions 3 by means of a cap nut 5. According to the above arrangement, a liquid passage to be connected to the up- and downstream piping (not shown) is formed through the valve by a central bore provided in each of these elements, as shown in FIG. 1. The ball 2 can be rotated by a handle 8 and a stem 7 through 90° about its axis to shut off the liquid passage, as illustrated in FIG. 2.

According to the above construction, an annular cavity A is left between the union 3 and the ball 2. In use, liquid transported through the valve gradually leaks into the cavity A through a contact area between a seat 9 and the surface of the ball 2 and is entrapped therein. This entrapped liquid may freeze and expand in winter, resulting in breakage of the valve. This causes another serious problem in that, when the valve is incorporated in the piping system for food industry, the entrapped liquid may putrefy because of the presence of bacteria and thus contaminate the entire system. Further, when the transported liquid is purified water, the purity of the entrapped water tends to be degraded over the lapse of a period of time.

Another such cavity having a tendency to entrap the liquid resides in the valve structure other than the above cavity A. That is, there is a second cavity B between the end surfaces of the union 3 and the body cap 4. The cavity B is inherently formed because an O-ring 10 for sealing a connection between the union 3 and the body cap 4 must have a thickness larger than the depth of a groove 11 accommodating the O-ring 10 to ensure tight sealing. The second cavity B directly entraps the liquid from the liquid passage, which liquid entrapment results in the same drawbacks as those of the first cavity A, even if the effects of the former are less than those of the latter.

In some cases, for example, as disclosed in Japanese Unexamined Patent Publication (Kokai) No. 57-37160, a further cavity C may exist in the inside wall of the outer end of the union formed by dents engageable with a special tool for screwing the union relative to the valve body. The cavity C also has drawbacks similar to those of the cavities A and B.

SUMMARY OF THE INVENTION

It is an object of the present invention to provide a ball valve free from the above drawbacks of the prior art.

It is another object of the present invention to provide a ball valve made of plastic, which has no cavities entrapping liquid to be transported.

The above objects of the present invention are achievable by a ball valve for controlling liquid flow comprising a tubular valve body, a ball rotatably built-in inside of the valve body and provided with a central through channel, a union screwed into each end of the valve body so as to be in slidable contact with the ball via a seat, and a body cap connected to each outer end of the union with a packing ring intervening therebetween for providing water-tight sealing, the packing ring being accommodated in an annular groove recessed on the opposed end surfaces of the union and/or of the body cap. The body cap is integrated to the union by means of a cap nut screwably engaged with a circumference of the valve body. In the present invention, the liquid flow passing through the valve is controlled by rotating the ball so that the direction of the channel of the ball is varied from a direction aligned with the axis of the valve body to a direction perpendicular to the axis of the valve body, the ball valve being characterized in that the union has, at the inner end thereof, an annular projection substantially filling up an annular cavity between the inner wall of the valve body and the outer surface of the ball.

According to a preferred embodiment of the present invention, the packing ring has the same inner diameter as that of the union and is provided with an annular rib or ribs to be accommodated into the entire length of the annular groove. Further, the rib or ribs of the packing ring preferably have a cross-section consisting substantially of a rectangle connected by a converged trapezoid to a base surface of the rib.

In another embodiment of the present invention, the union of the ball valve is provided with a flange having at least one recess on the circumference thereof for cooperating with a tool to rotate the union by screwing it relative to the valve body.

BRIEF DESCRIPTION OF THE DRAWINGS

Other features and advantages of the present invention will be apparent from the following description with reference to the attached drawings, in which.

DESCRIPTION OF THE PREFERRED EMBODIMENTS

Figure 1:
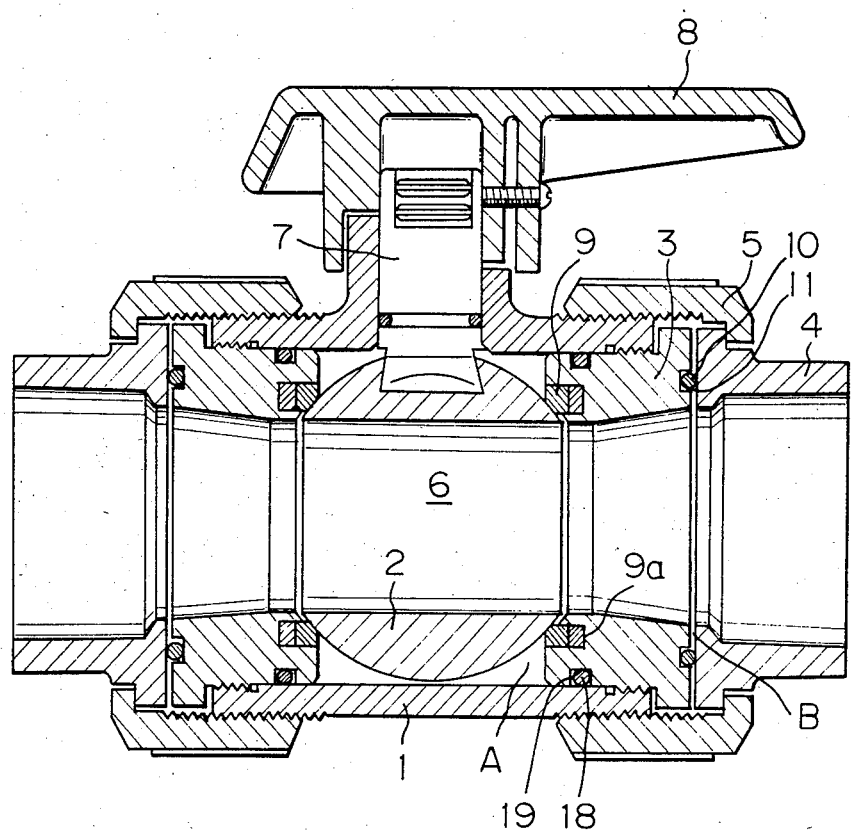
FIG. 1 is a sectional side view of a ball valve of the prior art illustrating a passage open position of a ball.
Figure 2:
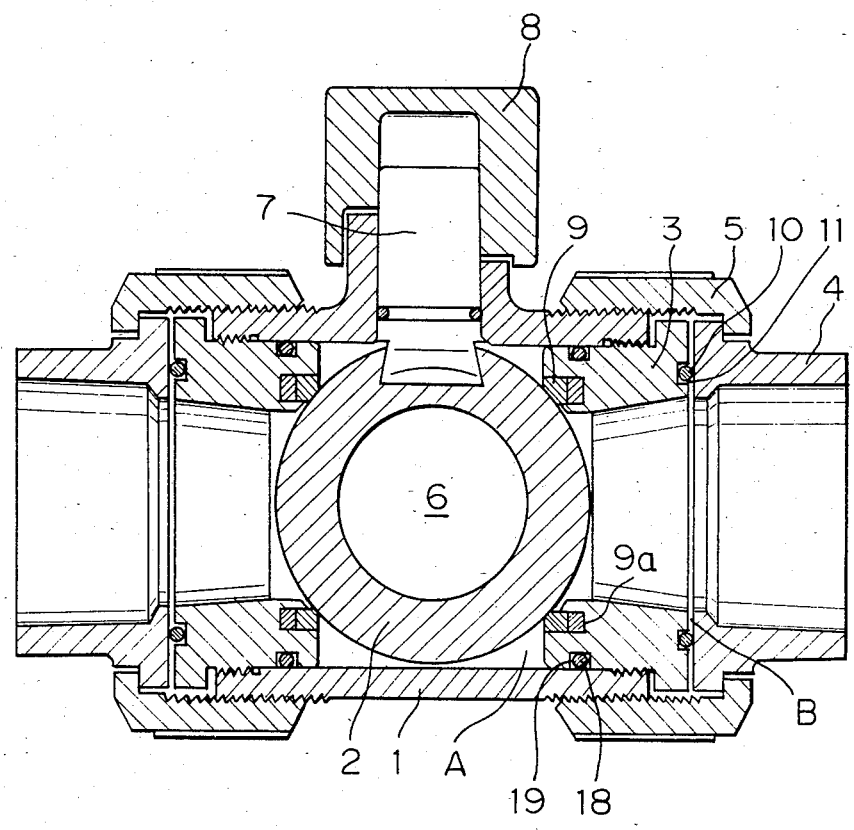
FIG. 2 is a view similar to FIG. 1 illustrating a passage close position of the ball.

A first embodiment of the present invention is described with reference to FIG. 3, in which the same reference numerals as FIGS. 1 and 2 are used for designating the same or corresponding parts thereof.

The ball valve of the first embodiment comprises a hollow substantially cylindrical valve body 1 made of a plastic such as polyvinyl chloride. A ball 2 is accommodated in the valve body 1. The ball 2 has a through channel 6 at a central portion threof and is rotatable about an axis perpendicular to the channel by means of a handle 8 connected to the upper part of the ball 2 by a stem 7 extending outward from inside the valve body 1. A hollow union 3 is screwed into each of the opposite ends of the valve body 1. An annular seat 9 made of a low friction material such as polytetrafluoroethylene is provided on the inside surface of the union 3 for providing a slidable contact with the circumference of the ball 2. The seat 9 is backed up with an elastomeric seat 9a and, thereby, can be resiliently pressed onto the ball 2 to form a water-tight seal between the ball 2 and the union 3. According to the present invention, the inner end of the union 3 extends to the innermost region along the circumference of the ball 2 with a small gap therebetween, to form an annular projection 3a. Therefore, a cavity A shown in FIG. 1, which naturally existed in the prior art valve between the ball 2 and union 3, can be filled by the projection 3a having a concaved spherical inner surface complementary to the circumference of the ball 2. The projection 3a may be molded separately from the remaining part of the union 3 and bonded thereto by adhesive. However, it is preferable to mold them together as a one-piece part.

Figure 3:
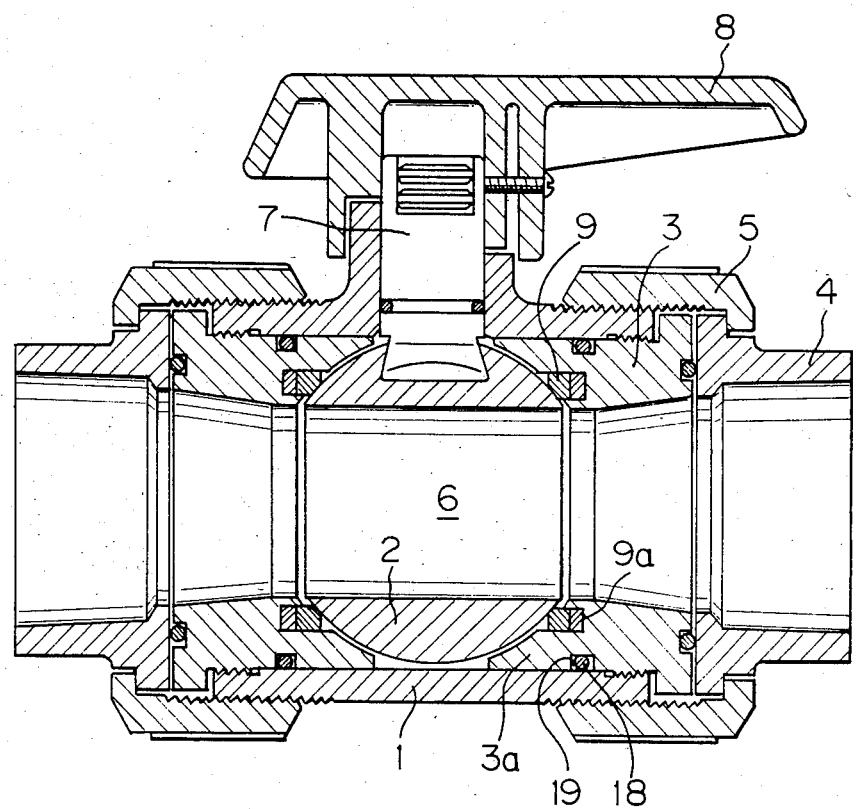
FIG. 3 is a sectional side view of a ball valve of an embodiment according to the present invention.
Figure 4:
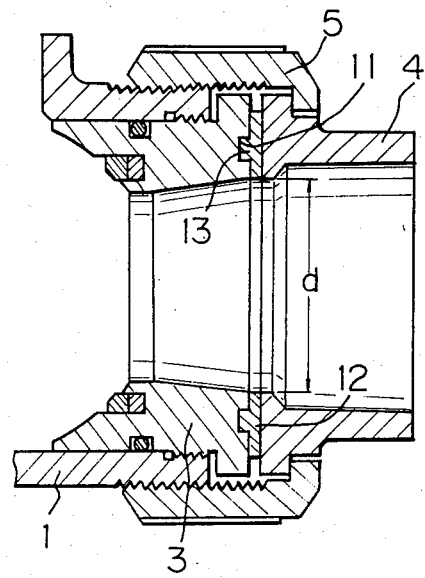
FIGS. 4 to 6 are sectional side view of parts of ball valves of different embodiments according to the present invention, illustrating a packing ring between a union and a body cap, respectively.

To eliminate the second cavity B between the union 3 and a body cap 4 connected to the outer end of the former, as stated in connection with the prior art, a second embodiment of the present invention shown in FIG. 4 has a unique packing ring 12 instead of a conventional O-ring 10 (see FIGS. 1, 2 or 3). The packing ring 12 has an inner diameter "d" the same as that of the union 3 and also has an annular rib 13 adapted to be tightly accommodated in the entire length of an annular groove 11 recessed on the end surface of the union 3 confronting the body cap 4. The packing ring 12 may be made of a suitable elastomeric material, including natural and artificial rubbers, in which styrene-butadiene rubber (SBR), chloroprene rubber (CR), butadiene-acrylonitrile rubber (NBR), ethylene-propylene rubber, and silicone rubber are preferable. A height of the rib 13 from a base surface 14 of the packing ring 12 is preferably somewhat larger than the depth of the groove 11, e.g., 0.2 to 0.3 mm.

Figure 5:
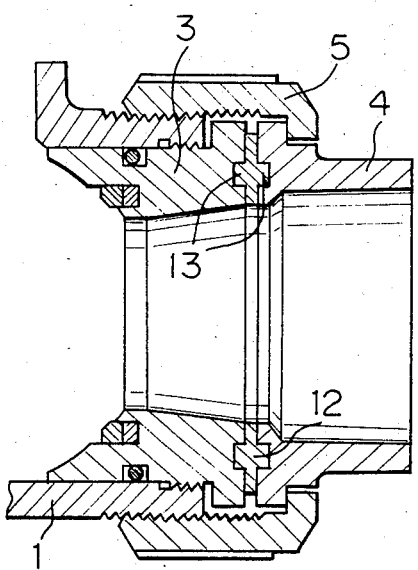
Figure 6:
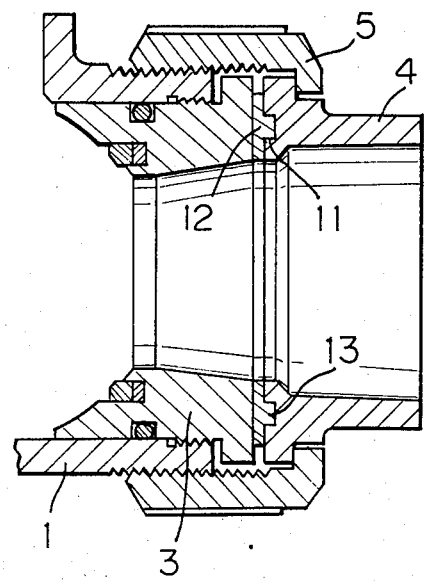

The annular groove 11 may provided on the end surface of the body cap 4 instead of or in addition to the end surface of the union 3. These instances are illustrated in FIGS. 5 and 6, respectively, as third and fourth embodiments of the present invention. In such cases, of course, the packing ring 12 should have a rib or ribs having a size and cross-section matching those of the grooves.

Figure 7:
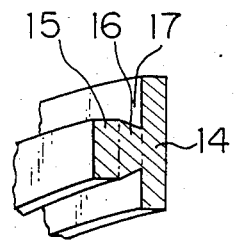
FIG. 7 illustrates a preferable cross-section of a packing ring according to the present invention.

The cross-section of the rib 13 may be of any shape, such as rectangular or semi-circular, provided good sealing can be obtained. However, it has been found that, as shown in FIG. 7, a rib consisting of a rectangle 15 connected by a converged trapezoid 16 to the base surface 14 of the packing ring 12 is most preferable. This is because a space 17 created between the converged trapezoid 16 and the side wall of the groove 11 can accommodate the expanded portion of the packing ring 12 caused by deformation when the ring 12 is pressed into the groove 11 by the screw engagement of the cap nut 5 with the valve body 1, whereby a tighter seal can be achieved.

As stated above, according to these embodiments there is no gap between the opposed end surfaces of the union 3 and of the body cap 4.

According to a fifth embodiment of the present invention, the ball valve further comprises, in addition to the abovesaid cavity-free construction, means for screwing the union rotative to the valve body which is also cavity-free. As illustrated in the foregoing drawings, the ball valve of the embodiments as well as that of the prior art has another O-ring 18 for sealing between the valve body 1 and the union 3. The O-ring 18 is accommodated in an annular groove 19 recessed on the circumference of the union 3, over which the inside wall of the valve body 1 is placed in a water-tight manner. Therefore, there exists a considerable frictional force between the O-ring 18 and the union 3, which resists the easy screwing of the union 3 relative to the valve body 1 and requires a suitable means for rotating the union 3.

Figure 8:
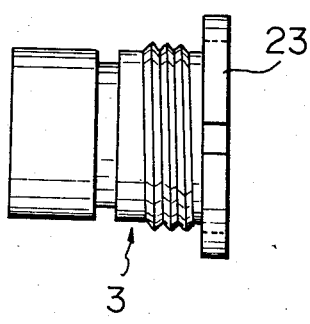
FIGS. 8 and 9 are, respectively, a side view and a front view of a union of a ball valve according to the present invention.
Figure 9:
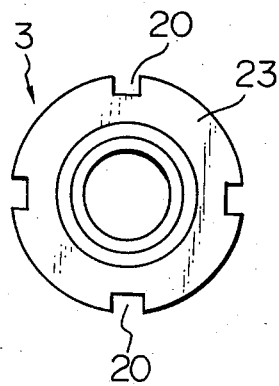
Figure 10:
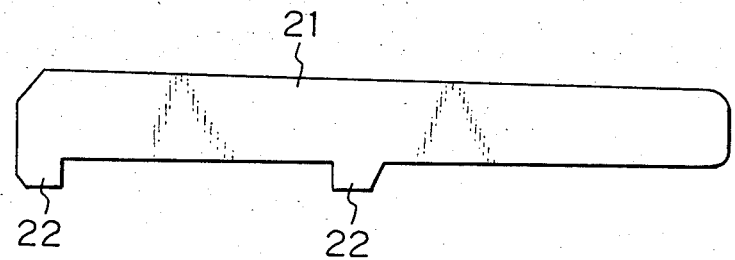
FIG. 10 is a side view of a tool for rotating a union.

Such a means in the prior art valve comprises dents provided on the inside wall of the union, as described before. Contrary to this, according to a fifth embodiment of the present invention shown in FIGS. 8 and 9, four dents 20 are recessed on the circumference of a flange portion 23 of the union 3 attached to the outer end thereof. Since the dents 20 are disposed far from the liquid passage through a seal formed by the packing ring 12, the dents 20 constitute no cavity having a tendency to entrap the liquid. The union 3 can be screwed into or out of the valve body 1 by the application of a special tool 21 (as shown in FIG. 10) so that projections 22 thereof engage the dents 20 and, by rotating the tool 21, the union 3 may be turned in the clockwise or anti-clockwise direction. The number of the dents 20 may be at least one, though four are preferable when the tool 21 is to be used. Each dent 20 is preferably located on the flange portion at an equi-angular distance.

As stated above, the ball valve according to the present invention eliminates cavities from the construction thereof, which cavities tend to entrap the liquid in the passage way during liquid transportation. Thereby, even when utilized in the food industry, the valve is always kept clean and free from any contamination caused by the putrescence of the liquid.

It is to be understood that the present invention may be embodied in other specific forms without departing from the spirit or essential characteristics of the present invention. The preferred embodiments are therefore to be considered illustrative and not restrictive. The scope of the invention is indicated by the appended claims rather than by the foregoing descriptions and all changes or variations which fall within the meaning and range of the claims are therefore intended to be embraced therein.

What is claimed is:

1. A ball valve for controlling liquid flow, comprising a tubular valve body, a ball rotatably mounted inside of said valve body and provided with a central through channel, a union positioned in each end of said valve body so as to be in slidable contact with said ball via a seat, and a body cap connected to each outer end of said union with a packing ring intervening therebetween for providing a water-tight seal, said union and said body cap having opposed end surfaces, said packing ring being accommodated in an annular groove recessed on at least one of said opposed end surface, said body cap being secured to said union by a cap nut engaged with a circumference of said valve body, whereby liquid flow passing through the valve is controlled by rotating said ball so that the direction of the channel of said ball is varied from a direction aligned with a longitudinal axis of said valve body to a direction perpendicular to said axis of said valve body, said union having, at the inner end thereof, an annular projection substantially filling an annular cavity between an inner wall of said valve body and an outer surface of said ball, said packing ring having the same inner diameter as that of said union and is provided with an annular rib to be accommodated into the entire length of said annular groove, said ball valve including a valve stem connected to said ball, said valve stem extending outwardly through said valve body, a portion of each annular projection located adjacent said stem when said channel is aligned with said axis.

2. The ball valve according to claim 1, wherein said annular projection extends along the outer surface of said ball and has a spherically concaved surface conforming with said outer surface.

3. The ball valve according to claim 1, wherein said groove has a rectangular cross-section and said rib has a cross-section comprising a rectangle connected by a converged trapezoid to a base surface of said rib so that said rib fills said groove.

4. The ball valve according to claim 1, wherein said union is screwed into said end of said valve body and is provided with a flange portion around the outer end thereof, said flange portion having at least one recess on a circumference thereof for cooperating with a tool to rotate said union so as to screw said union relative to said valve body.

5. The ball valve according to claim 4, wherein four recesses are provided around the flange portion at an angular distance of 90° to each other.

6. A ball valve according to claim 1, wherein said packing ring includes a planar base portion sealingly fitted between said opposed end surfaces so as to entirely fill space between said opposed end surfaces from said inner diameter of said union to said annular groove.

* * * * *